(12) United States Patent
Motukuri et al.

(10) Patent No.: US 10,089,520 B2
(45) Date of Patent: Oct. 2, 2018

(54) SYSTEM FOR DISPLAYING THE CONTENTS OF A REFRIGERATOR

(71) Applicants: Krishna V Motukuri, San Mateo, CA (US); Abhinav Katiyar, Santa Clara, CA (US)

(72) Inventors: Krishna V Motukuri, San Mateo, CA (US); Abhinav Katiyar, Santa Clara, CA (US)

( * ) Notice: Subject to any disclaimer, the term of this patent is extended or adjusted under 35 U.S.C. 154(b) by 334 days.

(21) Appl. No.: 15/075,186

(22) Filed: Mar. 20, 2016

(65) Prior Publication Data

US 2016/0282039 A1  Sep. 29, 2016

Related U.S. Application Data

(63) Continuation of application No. 62/138,391, filed on Mar. 26, 2015.

(51) Int. Cl.
| | |
|---|---|
| *H04N 5/00* | (2011.01) |
| *G06K 9/00* | (2006.01) |
| *F25D 27/00* | (2006.01) |
| *H04N 1/00* | (2006.01) |
| *H04N 5/232* | (2006.01) |
| *F25D 29/00* | (2006.01) |

(52) U.S. Cl.
CPC ....... *G06K 9/00288* (2013.01); *F25D 27/005* (2013.01); *F25D 29/00* (2013.01); *G06K 9/00248* (2013.01); *H04N 1/00204* (2013.01); *H04N 5/23203* (2013.01); *F25D 2500/06* (2013.01); *H04N 5/23222* (2013.01); *H04N 5/23241* (2013.01)

(58) Field of Classification Search
CPC ........ H04N 13/00; G09G 5/00; G06T 19/006; G02B 27/0172; G02B 2027/0178
See application file for complete search history.

(56) References Cited

U.S. PATENT DOCUMENTS

| | | | | |
|---|---|---|---|---|
| 6,459,919 B1* | 10/2002 | Lys | ...................... | A61N 5/0616 315/291 |
| 6,919,795 B2* | 7/2005 | Roseen | ................... | F25D 25/00 340/309.16 |
| 7,903,838 B2* | 3/2011 | Hudnut | ................... | A47J 37/00 382/100 |
| 8,441,534 B2* | 5/2013 | Hubmer | ............. | G08B 21/0275 348/143 |

(Continued)

OTHER PUBLICATIONS https://community.nxp.com/thread/308951; Magnetometer vs. Magnetic Rotary Sensor.*

*Primary Examiner* — Frank F Huang
(74) *Attorney, Agent, or Firm* — Michael Toback

(57) ABSTRACT

A system for remotely monitoring the contents of a refrigerator, consisting of monitor and remote components. The monitor component is associated with a user and a refrigerator. The monitor component has a camera, light sensor, angular position sensor and a computer. The light sensor determines when the computer is powered on, the computer and position sensors determine when the camera will take pictures. The quality of the picture information is calculated, and the picture information is sent to the remote component. A user can request the picture information for a refrigerator that he is associated with.

17 Claims, 4 Drawing Sheets

(56) References Cited

U.S. PATENT DOCUMENTS

| | | | | |
|---|---|---|---|---|
| 8,690,273 B2* | 4/2014 | Dolinsek | F25D 23/028 | 312/223.6 |
| 8,756,942 B2* | 6/2014 | Min | F25D 29/00 | 62/125 |
| 8,912,905 B2* | 12/2014 | Wong | F21V 23/0464 | 340/572.4 |
| 8,935,938 B2* | 1/2015 | Krause | C02F 1/001 | 62/129 |
| 9,024,716 B2* | 5/2015 | Yum | F25D 29/00 | 340/3.1 |
| 9,173,188 B2* | 10/2015 | Miyawaki | H04W 64/00 | |
| 9,357,873 B2* | 6/2016 | Reyhanloo | A47J 31/4485 | |
| 9,412,086 B2* | 8/2016 | Morse | F25D 29/00 | |
| 9,545,930 B2* | 1/2017 | Ricci | G01C 21/3484 | |
| 2002/0066279 A1* | 6/2002 | Kiyomatsu | F25D 29/00 | 62/125 |
| 2008/0278324 A1* | 11/2008 | Uchimura | G01S 1/70 | 340/572.1 |
| 2010/0170289 A1* | 7/2010 | Graziano | H04N 7/181 | 62/449 |
| 2010/0225484 A1* | 9/2010 | Van De Sluis | G01S 1/70 | 340/572.4 |
| 2012/0241043 A1* | 9/2012 | Perazzo | A61J 7/0053 | 141/2 |
| 2014/0043433 A1* | 2/2014 | Scavezze | G06T 19/006 | 348/42 |
| 2014/0232866 A1* | 8/2014 | Lee | G01S 5/16 | 348/143 |
| 2014/0313693 A1* | 10/2014 | Seo | F25D 27/005 | 362/94 |
| 2014/0320647 A1* | 10/2014 | Seo | F25D 29/00 | 348/143 |
| 2015/0267960 A1* | 9/2015 | Cheon | F25D 29/00 | 62/127 |
| 2016/0033194 A1* | 2/2016 | Sumihiro | F25D 23/04 | 62/125 |
| 2016/0088262 A1* | 3/2016 | Lee | F25D 29/00 | 704/275 |

* cited by examiner

SYSTEM FOR DISPLAYING THE CONTENTS OF A REFRIGERATOR

This patent is a continuation of "A System for Displaying the contents of a Refrigerator", filed on Mar. 26, 2015 as U.S. application Ser. No. 62/138,391.

BACKGROUND OF THE INVENTION

Field of the Invention

This invention generally relates to enabling the remote monitoring of the contents and health of home appliances, specifically refrigerators.

Background and Description of the Related Art

Items are stored in areas that are remote from where they are purchased. For example, food is stored in refrigerators inside of the house, but we fill it with groceries that are purchased in a store remote from the refrigerator. When we are at the store, we cannot see what we have in the refrigerator, how much of each food we have or how old the food it.

The inside of a refrigerator consists of one or more shelves and drawers which hold the food, both inside the body of the refrigerator and inside the door. When the refrigerator is opening, the light goes on, and stays on until the door closes. The state of the refrigerator is only interesting when the door is closing, because at that time the individual has either taken out or put in whatever it is he is using or has used, and so only when the door is closing is the light on and the refrigerator is in a stable state.

In "Vision-Enabled Household Appliances" (U.S. Pat. No. 7,903,838), Hudnut and Gross describe a device that uses a camera to identify certain objects associated with an appliance, such as identifying which items need to be replenished or restocked in a refrigerator. The identification of the objects is done by a processor and a camera in the refrigerator, which then displays the contents of the refrigerator on the front of the refrigerator, or generate a list of items to order through a web site. All of the processing for this would have to take place inside the refrigerator, and Hudnut and Gross do not teach a way to limit images of the contents of the refrigerator only when the refrigerator is in a stable state and light is available; i.e. when the door is closing.

A solution is needed to enable users to remotely determine the contents of a refrigerator using the existing refrigerator.

SUMMARY

The invention consists of a device placed in the refrigerator and external storage that communicates with the device. The device will take pictures of the inside of the refrigerator and send the pictures to the external storage. On request the external storage will send the pictures to a user.

BRIEF DESCRIPTION OF THE DRAWINGS

A better understanding of the present invention can be obtained from the following detailed description in conjunction with the following drawings, in which.

The figures are provided in order to provide a thorough understanding of the present invention. The figures should not be construed as limiting the breath of the invention in any manner.

DETAILED DESCRIPTION

Figure 1:
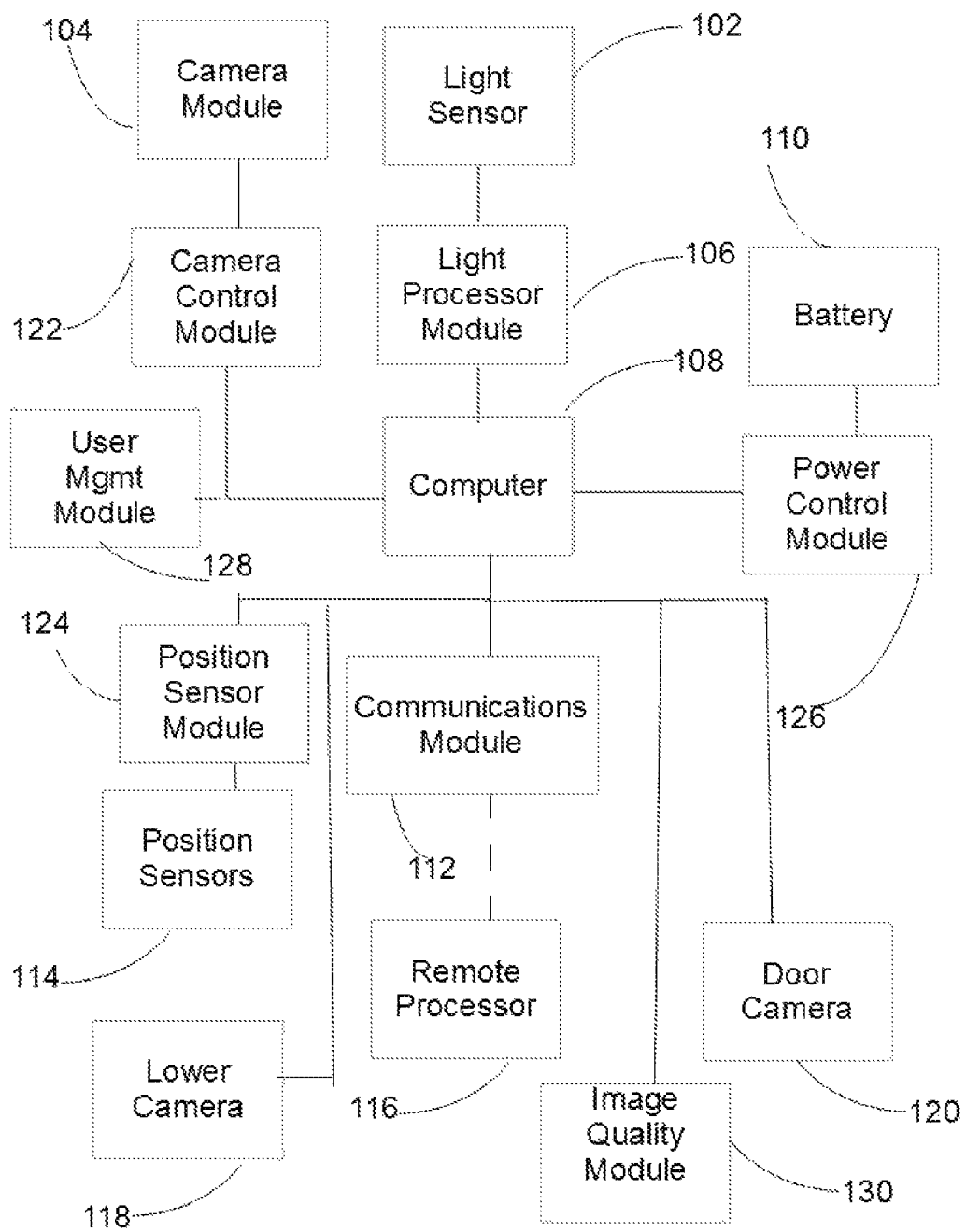
FIG. 1 shows a block diagram for one or more embodiments of the monitoring system.

As shown in FIG. 1, one or more embodiments of the monitor system consists of a light sensor 102, camera module 104, light processor module 106, computer 108, battery 110, communications module 112, position sensors 114, remote processor 116, camera control module 122, position sensor module 124, power control module 126, user management module 128, and an image quality module 130.

In one or more embodiments, the camera module 104, coupled to the computer 108, is positioned on the refrigerator door on or about the top corner of the refrigerator door nearest to the door handle, so as to optimize the view of the refrigerator by providing the camera a clear view of the entire refrigerator. For refrigerators that are too tall for the camera lens to acquire all of the refrigerator, a lower camera module 118 can be placed looking at the lower part of the refrigerator. In one or more embodiments a door camera 120 can be placed in the refrigerator body to look back at the refrigerator door. The camera control module 122, coupled to the computer, is configured to communicate with the additional camera modules so that it triggers all of the camera modules at the same time.

In one or more embodiments, the camera module 104 can take pictures quickly (milliseconds apart) at different exposures or using multiple sensors that can be combined to produce better depth in one or more images.

When the refrigerator is opened, the light sensor 102, coupled to the computer 108 via the light processor module software 106, detects that the refrigerator light is on and wakes up the computer 108. Angular Position Sensors 114 provide a means to measure the angular position of the refrigerator door along the horizontal axis. In one or more embodiments, Angular Position Sensors 114 can be any combination of a magnetometer, accelerometer, or gyroscope. In other embodiments, an integrated angular position sensor can be used. In one or more embodiments, the magnetometer returns a value which is a combination of values along the horizontal and vertical axis. The accelerometer reading returns values along the horizontal plane of motion along with the vertical acceleration of gravity. The device used to calculate the angular position is used to nullify the vertical axis of the magnetometer, yielding the value in the horizontal axis alone, which corresponds to the angular position of the door along the horizontal axis.

In one or more embodiments, the user management module 128 software, coupled to the computer 108, accepts requests to associate user identification information with the monitor system. This information is communicated to the remote processor 116 so that the image data is tagged and retrievable based on the user identification information.

There are many ways to calculate the door position. In one or more embodiments, position calculations are done using a standard method from the SensorManager class, see: http://developer.android.com/reference/android/hardware/SensorManager.html#getRotationMatrix(float[ ], float[ ], float[ ], float[ ]).

In other embodiments, the position of the door is calculated relative to geographic north, which can be acquired from the Angular Position Sensors 114.

In one or more embodiments, when the refrigerator door is detected to be between 30 and 60 degrees while closing, the computer 108 turns on the camera module 104 and sends a request to the camera module 104 to take one or more pictures of the refrigerator contents. The computer 108 accepts the pictures and the image quality module 130 compares them in several ways to determine the best pictures to send back to the remote processor 116. The boundaries of the refrigerator are known and used to determine the optimal view. In one or more embodiments, the computer 108 can determine whether the pictures are under or overexposed using pixel intensity, choosing the best pictures. In one or more embodiments, whether or not an image is under or overexposed can be determined by analyzing a histogram of the image, as described in http://kenrockwell.com/tech/histograms. The pictures are sent to the remote processor 116, including the estimated angle where the picture was taken. In one or more embodiments, pictures are taken at multiple angles while the door is closing. These pictures can be combined using digital analysis to provide relative depth of objects, and can help generate a three-dimensional view of the refrigerator contents. This three-dimensional view can be used to recognize objects with greater success.

Figure 4:
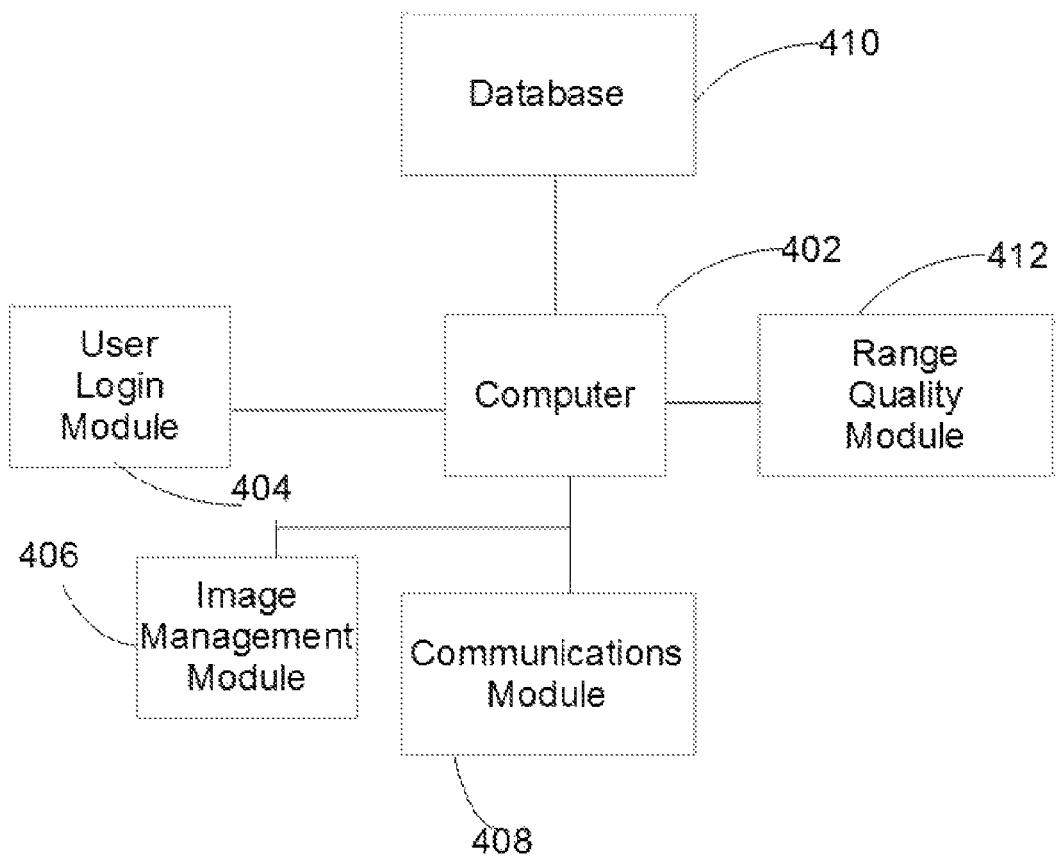
FIG. 4 shows a block diagram for one or more embodiments of the remote processor.

In one or more embodiments, as shown in FIG. 4, the remote processor consists of a computer 402, coupled to a user login module 404, image management module 406, communications module 408, and a database 410. In one or more embodiments, the communications module 408 is configured to accept requests to save and retrieve image data. In one or more embodiments, the database 410 stores image data and makes it retrievable by user identification information. In one or more embodiments, the image management Module 406 accepts requests to store and retrieve data from the database 410 based on user identification information.

In one or more embodiments, the remote processor contains a range quality module 412, configured to determine what angle range is best based on calculating the coverage of the inside of the refrigerator by the picture and return updated angle ranges to the monitor computer 108 to improve the picture quality. If the picture was taken too soon, it will not show one side of the interior. If the camera clicks too late, then it will not show the other side of the interior. The area of coverage can be automatically determined and evaluated by looking for standard "edge markers" like trays and fridge walls.

In one or more embodiments, the light sensor 102 detects when the refrigerator is opened. When the light reaches a certain level, the light sensor sends a signal to the light processor module 106 which notifies the computer 108. The computer 108 commands the camera module 104 to take a picture based on the angular position of the door. In one or more embodiments, the computer 108 will notify the lower camera 118 and door camera 120 to take a picture at the same time. When the camera module 104 has taken one or more pictures, the image quality module 130 analyzes the pictures for quality, and if one or more pictures meet the quality criteria, the computer 108 sends the pictures to the communications module 112 which transmits the picture to the remote processor 116. In one or more embodiments, the picture is tagged with the angular position information.

In one or more embodiments, the processing is done in such a way to minimize the load on the battery 110, improving battery life. The computer 108 is off or at minimal power when door is closed. In one or more embodiments, the computer has specialized logic in its hardware to allow an external signal to wake it up quickly from a deep sleep mode. The light sensor 102 wakes the computer 108 up when door is opened. The camera module 104 is only powered up when the position sensors 114 determine that it within the angular range for taking pictures and only when the door is closing. The communications module 112 is only used when ready to upload a picture and then only as long as needed to push the picture.

In one or more embodiments, the battery 110 is a lithium battery, as that works better in cold temperature.

On request, a user may request from the remote processor 116 a picture of the latest contents of the refrigerator. In one or more embodiments, the user makes a request over a secure interface such as HTTPS. After authenticating the user, the remote processor 116 queries its database for the most recent image in the user's account and returns it to the user.

Figure 2:
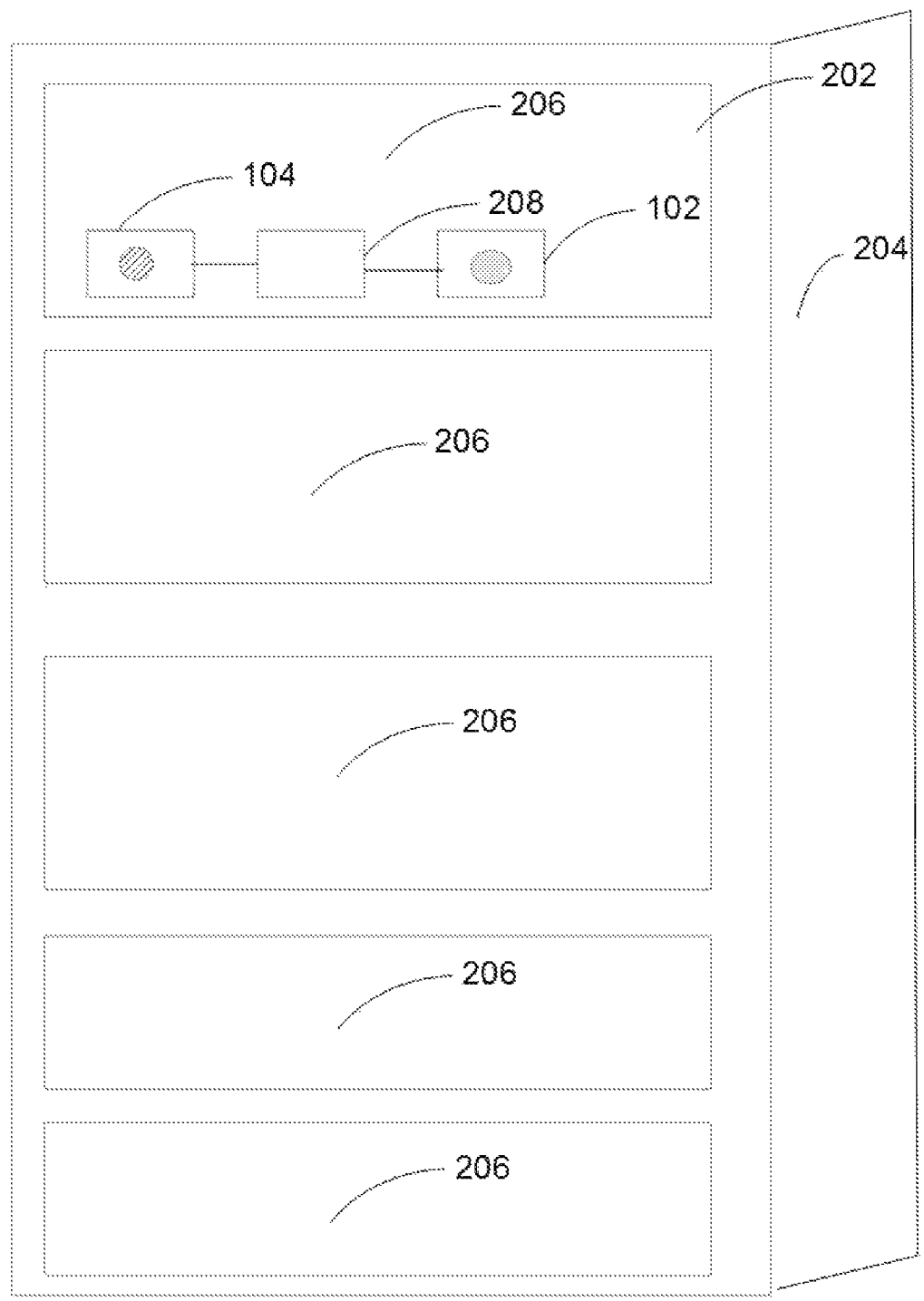
FIG. 2 shows a configuration for one or more embodiments of the installed monitoring system inside the refrigerator

FIG. 2 shows an embodiment of the processing of the monitoring system. The monitoring system consists of those components which are installed inside of the refrigerator door 202. The door camera 120 is positioned on a shelf 206 in the refrigerator door 202 such that it has a view of the contents of the refrigerator body 204. In one or more embodiments, other cameras may be positioned inside the refrigerator body 204 to provide a view of the contents in the refrigerator door 202. In one or more embodiments, the door camera 120 can be attached to the wall of a refrigerator shelf 206 using vacuum pads or similar mechanism. In other embodiments the door camera 120 can stand on the top shelf 206 of the refrigerator door. However the door camera 120 is placed or attached, it needs to be pointing towards the refrigerator body 204, looking slightly down in order to see the whole compartment starting from just below the ceiling of the main compartment. In one or more embodiments, a mechanism is provided with the door camera 120 to adjust the angle of tilt, which can be commanded by the computer 108.

In one or more embodiments, the door camera 120 is electronically attached to a processing device 208. The processing device 208 includes a computer 108, software, storage, memory and power. In one or more embodiments, the software is configured to accept a user identifier, to establish a connection to a remote processor, to manage low-power and high power modalities based on input from the light sensor 102, to control the camera to take one or more pictures based on a calculation of the angle of the refrigerator door 202 relative to the refrigerator body 204, and to process the image data from the picture, and to send the image data to a remote processor tagged with the user identification data.

A light sensor 102 is attached to the processing device 208, such that the computer 108 inside the processing device is configured to go from a low power state to an active state upon detection of light, and power can be routed to the door camera 120 as well as other cameras attached to the processing device 208.

Figure 3:
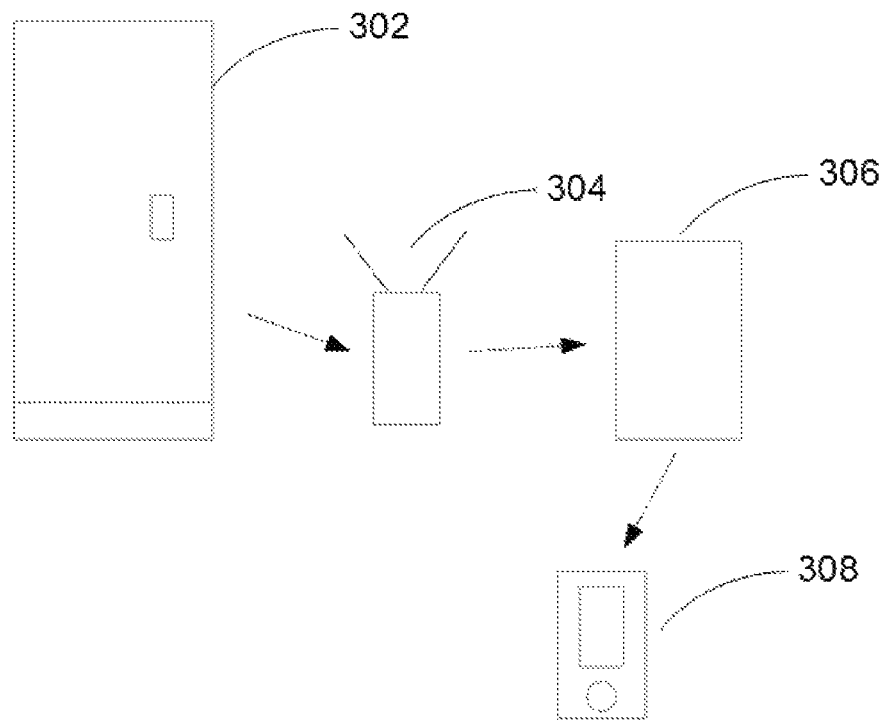
FIG. 3 shows the configuration for one or more embodiments of the system.

FIG. 3 shows an embodiment of the system. On having an updated picture of the inside of the refrigerator, the processor in the refrigerator 302 communicates with a remote processor 306 via a wireless connection through the user's router 304. On request from a remote computer 308, such as a smart phone, PC, or tablet, the remote processor 306 sends the latest picture of the inside of the refrigerator in response.

In one or more embodiments, the remote processor comprises of a wireless communications means, computer, software, a storage means, memory, and power. In one or more embodiments, the wireless communications means is an external router. In other embodiments, the wireless communications means is a network interface card coupled to the computer. In one or more embodiments, the storage means is one or more local disks. In other embodiments, the storage means is a cloud-based storage device. In other embodiments, the storage means is a database.

The software in the remote processor 306 is configured to accept image data from one or more monitoring systems, tag them with the user identification information associated with the refrigerator and store the image data coupled to the user identification information in its' storage means. The software in the computer is also configured to accept requests from one or more users and return image data to them associated with their user identification. In one or more embodiments, the user identification information is associated with a specific refrigerator as well as the user or users who can access it.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Additionally, communication media typically embodies computer-readable instructions, data structures, program modules, or other data in a modulated data signal such as a carrier wave, data signal, or other transport mechanism and includes any information delivery media. The term "modulated data signal" and "carrier-wave signal" includes a signal that has one or more of its characteristics set or changed in such a manner as to encode information, instructions, data, and the like, in the signal.

In one or more embodiments, programming instructions for executing above described methods and systems are provided. The programming instructions are stored in a computer readable media.

With the above embodiments in mind, it should be understood that one or more embodiments of the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

It should also be understood that this could apply to any closed container with a door, such that the container had contents of interest and a light or other notification means indicating that the door of the container was opened. Examples might be a freezer chest or a pantry.

Any of the operations described herein that form part of one or more embodiments of the invention are useful machine operations. One or more embodiments of the invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The programming modules and software subsystems described herein can be implemented using programming languages such as Flash, JAVA™, C++, C, C#, Visual Basic, JavaScript, PHP, XML, HTML etc., or a combination of programming languages. Commonly available protocols such as SOAP/HTTP may be used in implementing interfaces between programming modules. As would be known to those skilled in the art the components and functionality described above and elsewhere herein may be implemented on any desktop operating system such as different versions of Microsoft Windows, Apple Mac, Unix/X-Windows, Linux, etc., executing in a virtualized or non-virtualized environment, using any programming language suitable for desktop software development.

The programming modules and ancillary software components, including configuration file or files, along with setup files required for providing the method and apparatus for troubleshooting subscribers on a telecommunications network and related functionality as described herein may be stored on a computer readable medium. Any computer medium such as a flash drive, a CD-ROM disk, an optical disk, a floppy disk, a hard drive, a shared drive, and storage suitable for providing downloads from connected computers, could be used for storing the programming modules and ancillary software components. It would be known to a person skilled in the art that any storage medium could be used for storing these software components so long as the storage medium can be read by a computer system.

One or more embodiments of the invention may be practiced with other computer system configurations including hand-held devices, microprocessor systems, microprocessor-based or programmable consumer electronics, mini-computers, mainframe computers and the like. The invention may also be practiced in distributing computing environments where tasks are performed by remote processing devices that are linked through a network.

One or more embodiments of the invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

While one or more embodiments of the present invention have been described, it will be appreciated that those skilled in the art upon reading the specification and studying the drawings will realize various alterations, additions, permutations and equivalents thereof. It is therefore intended that embodiments of the present invention include all such alterations, additions, permutations, and equivalents as fall within the true spirit and scope of the invention as defined in the following claims. Thus, the scope of the invention should be defined by the claims, including the full scope of equivalents thereof.

The invention claimed is:

1. A system which enables remote monitoring of the contents of a container, the container consisting of a storage area, a container door, a light means for lighting the inside of the container when the container door is opened, and a body, the container door coupled to the body such that it creates a closed container when the door is moved against the body of the container, the system comprising:

a processor, coupled to the inside of the door, the processor comprising a computer, storage means, and a power means, a camera module, coupled to the processor, positioned to view the contents of the container, a light sensor, coupled to the processor, capable of detecting the light means, an angular position sensor means, coupled to the processor, capable of detecting the angular motion of the door, a communications module, coupled to the processor, configured to transmitting output digital communications signals, a light processor module, coupled to the processor and light sensor, configured to notify the computer when the light means is on or off, a remote processor, coupled to the communications module, configured to accept image data from the communications module, accept requests from an authenticated user to get image data, and send image data to the authenticated user, an image quality module, coupled to the remote processor, configured to calculate the quality of the image by calculating the total coverage of the inside of the refrigerator and returning a range of angular positions of the door which give the best coverage, where the light sensor signals the light processor module when the light means is on or off, and the light processor module notifies the processor of the state of the light means.

2. The processor in claim 1, further comprising a position sensor module, coupled to the computer, configured to accept inputs from the angular position sensor means to determine the angular position of the door.

3. The processor in claim 1, further comprising camera control module, coupled to the computer, configured to calculate the angular position to get an image of the contents of the container and to accept image data from the camera module.

4. The processor in claim 1, further comprising a power control module, coupled to the computer, configured to provide power to the camera module and request the camera module to capture an image of the contents of the container.

5. The processor in claim 1, further comprising an image quality module, coupled to the computer, configured to determine the quality of the image data, and send the image data to the communications module.

6. The processor in claim 1, further comprising a user management module, coupled to the computer, configured to accept user identification information and tag image data with that user identification information.

7. The processor in claim 1, the communications module further configured to establish a link with a remote processor.

8. The remote processor in claim 1, further comprising a user login module, configured to accept a request to authenticate a user.

9. The remote processor in claim 1, further comprising an image management module, coupled to the remote processor, configured to accept a request to obtain the image data of a container associated with that user and send that image data.

10. The system in claim 1, the remote processor further configured to return image information on request from a user based on the user identification information.

11. The system in claim 1, where the angular position sensor means is a magnetometer.

12. The system in claim 1, where the angular position sensor means is an accelerometer.

13. The system in claim 1, where the angular position sensor means is a gyroscope.

14. A method for tracking the contents of a container, the container consisting of a storage area, container door, a light means for lighting the inside of the container when the container door is opened, and a body, the door coupled to the body such that it creates a closed container when the door is moved against the body of the container, the method using:

a computer, a light sensor coupled to the computer which senses when the light means is on, a light sensor module coupled to the light sensor and computer, configured to notify the computer when the light goes on or off, a camera coupled to the computer, a camera module, coupled to the computer, configured to command the camera to take a picture, an angular position sensor means coupled to the computer, a remote processor coupled to the computer, configured to store pictures and accept requests to send the pictures, an image quality module, coupled to the remote processor, configured to calculate the quality of the image by calculating the total coverage of the inside of the refrigerator and returning a range of angular positions of the door which give the best coverage, the method comprising:

sensing when the light means is on, turning the computer on, commanding the camera to take a picture, accepting a picture, calculating the picture quality, sending the picture to the remote processor, updating the range of angular positions to take a picture, and accepting a request to view the picture, and sending the picture to the requestor.

15. The method in claim 14, further comprising a step of turning the camera on.

16. The method in claim 14, further comprising a step of calculating when the door is in position to take pictures.

17. The method in claim 14, further comprising a step of determining the best range of angular positions to take pictures.

* * * * *